United States Patent [19]

Kou

[11] Patent Number: 5,431,938
[45] Date of Patent: Jul. 11, 1995

[54] PROCESSING SMALLER SHRIMP TO SIMULATE LARGER FROZEN SHRIMP

[75] Inventor: Ming B. Kou, Rolling Hill Estates, Calif.

[73] Assignee: Red Chamber Co., Vernon, Calif.

[21] Appl. No.: 249,542

[22] Filed: May 26, 1994

[51] Int. Cl.⁶ ................................. A23L 1/33
[52] U.S. Cl. ........................ 426/291; 426/92;
426/129; 426/293; 426/296; 426/393; 426/396;
426/479; 426/643
[58] Field of Search ........... 426/291, 293, 296, 302,
426/643, 479, 438, 393, 396, 524, 92, 129, 289,
104

[56] References Cited

U.S. PATENT DOCUMENTS

| | | | |
|---|---|---|---|
| 2,740,721 | 4/1956 | Hice et al. | 426/293 |
| 2,938,803 | 5/1960 | Gorton | 426/643 |
| 3,152,915 | 10/1964 | Cover et al. | 426/293 X |
| 3,780,196 | 12/1973 | Domecki | |
| 4,092,435 | 5/1978 | Teijeiro | 426/296 |
| 4,371,560 | 2/1983 | Hochhauser et al. | 426/643 |
| 4,584,204 | 4/1986 | Nishimura et al. | 426/643 |
| 4,816,276 | 3/1989 | Blazevich | 426/429 |
| 4,855,158 | 8/1989 | Kawana | 426/643 |
| 4,889,742 | 12/1989 | Sasamoto et al. | 426/643 |
| 4,900,570 | 2/1990 | Matsubara | 426/250 |
| 4,919,957 | 4/1990 | Ikeuchi et al. | 426/513 |
| 5,009,918 | 4/1991 | Clairouin et al. | 426/643 |
| 5,188,854 | 2/1993 | Hartman et al. | 426/272 |

Primary Examiner—Arthur L. Corbin
Attorney, Agent, or Firm—Natan Epstein

[57] ABSTRACT

A composite seafood product is made by assembling smaller butterflied shrimp into composites of two to four shrimp, all but/one of which are tailless, resembling in appearance a single large butterflied shrimp. The shrimp composites are dusted and frozen apart from each other to retain individuality. The individual composites can then be coated with batter and deep fried to yield a food product seemingly consisting of large individual shrimp.

40 Claims, 3 Drawing Sheets

110.- Defrost block frozen shrimp

120.- Size sort defrosted shrimp

130.- Deshell, devein, wash and drain

140.- Remove tail of smaller shrimp

150.- Butterfly cut shrimp

160.- First tray dusting

170.- Place and spread larger shrimp in tray pocket

180.- Place and spread smaller shrimp over larger shrimp on tray to make composite shrimp 190.- Repeat steps 170 and 180 for each tray pocket until tray is filled with composite shrimp 200.- Second tray dusting 210.- Bag tray with shrimp 220.- Blast freeze bagged traywith composite shrimp 230.- Ship frozen composite shrimp to food preparation site 240.- Dip frozen or semi-frozen composite shrimp in frying batter 250.- Drop batter coated composite shrimp in frying liquid 260.- Serve composite shrimp for consumption

Fig. 7

PROCESSING SMALLER SHRIMP TO SIMULATE LARGER FROZEN SHRIMP

BACKGROUND OF THE INVENTION

This invention pertains to the field of seafood processing and more specifically concerns the processing of fresh shrimp into frozen shrimp preliminary to commercial distribution. The consumption of shrimp as a food item is such that the supply of ocean caught shrimp or wild shrimp is supplemented by extensive shrimp farming operations. Because the environment and feeding of cultivated shrimp can be controlled, farm grown shrimp offer a number of advantages over ocean caught shrimp. For example, cultivated shrimp are less prone to contamination with microorganisms harmful to humans who consume the shrimp, since such organisms can be filtered from the pond water in which the shrimp are grown, and eliminated from the feed provided to the shrimp. This facilitates the subsequent processing of the shrimp which do not require the more careful washing and handling required by wild shrimp. A further advantage of cultivated shrimp is that each batch can be raised to a particular size which will be substantially uniformed for nearly all shrimp in the batch at harvesting.

1. Field of the Invention

This invention pertains to the field of seafood processing preliminary to commercial distribution and more particularly discloses a process for assembling and packaging smaller shrimp so as to simulate frozen larger shrimp.

2. State of the Prior Art

Shrimp is a popular food item in the United States and throughout the world. The commercial supply of shrimp includes ocean shrimp fished from seas around the globe and cultivated shrimp harvested by extensive shrimp farming operations in many countries. Shrimp are commercially available in a wide range of sizes, graded by the number of shrimp required to make up one pound of weight, from 500 count for the smallest commercially useful shrimp up to about one pound shrimp for fully grown tropical specimens. At the small end of the range, the shrimp are tiny and not appropriate nor satisfying as individual morsels. Fully mature shrimp on the other hand, while visually satisfying on a plate, tend to be tough in texture. Shrimp sizes between 150 count to about 30 count are most commonly sold for consumption in restaurants and fast food outlets, establishments which serve shrimp in large quantities, typically as deep fried shrimp. So called jumbo shrimp, often sold at a premium price, are about 16-25 count.

The average consumer has a preference for larger shrimp over smaller shrimp. This preference, however, cannot always be accommodated by the available supply of shrimp. This is particularly true of ocean caught shrimp, over which little control is possible in terms of the size of the individual specimens. The supply of larger size shrimp, in the range of 75 count to 30 count is currently limited due to a widespread infection which has destroyed much of the shrimp stock under cultivation in the People's Republic of China, a major supplier of cultivated shrimp, forcing greater reliance upon ocean caught shrimp. Ocean shrimp cannot be harvested at a particular size and consequently the catch includes a considerable supply of relatively small shrimp, and less than desired of the larger sizes.

What is needed, is a method by which the smaller, readily available shrimp can be used to simulate the larger more desirable shrimp.

Fresh shrimp, both ocean caught and cultivated, are first processed by so called "packers", who grade and segregate shrimp according to size, and dehead the shrimp, i.e. cut off the head and the lower appendages including the legs and swimerettes, leaving the shrimp in its shell with the tail attached. The graded shrimp are then preserved by freezing in blocks of ice. This so called block shrimp is then sold to distributors who further process the shrimp for sale to markets, restaurants and fast food outlets.

SUMMARY OF THE INVENTION

The invention disclosed below addresses the aforementioned need by providing a method of processing block frozen smaller shrimp to make a composite shrimp food product suitable for deep frying, so as to simulate shrimp of larger size.

Block frozen shrimp are thawed and the shrimp are shelled, deveined, and washed in a dilute bleach solution. The shelled shrimp are then separated into larger and smaller shrimp. The tail is removed from the smaller shrimp, preferably by pulling off so as to leave attached the tail meat. The tail is left on the larger size shrimp. The shrimp in both groups are butterflied by slicing longitudinally along the dorsal side of the shrimp body.

The method of this invention involves the use of a tray which has an array of relatively shallow pockets, each of which is preferably drop shaped, i.e. has a rounded wide end tapering to a narrow end. The empty tray is first lightly dusted, preferably with finely ground white flour. Each pocket is then filled by first placing a larger size shrimp on the dusted bottom of the pocket, the shrimp being oriented with its tail towards the tapered narrow end of the pocket, the truncated head end of the shrimp body towards the wide rounded end of the pocket, and the slit dorsal side of the shrimp spread open so that the two sides of the shrimp body are laid nearly flat on the pocket bottom. A smaller shrimp is then laid onto the first shrimp, in the same orientation relative to the tray pocket and is likewise spread open to a generally flat condition over the first shrimp, so that the butterflied cuts of the superimposed shrimp are approximately aligned one over the other, to make a two-shrimp composite. The tray pockets are filled in this manner with paired shrimp, the tray with the shrimp composites is again lightly dusted. The loaded tray is then inserted in an impermeable bag and subjected to blast freezing, preferably at a temperature of about minus 85° Fahrenheit. The trays with the frozen shrimp may then be boxed, or the tray contents may be emptied loosely into a bag, for commercial distribution. The paired shrimp composites assembled according to the method of this invention are best prepared for eating by dipping in a batter and deep frying by immersion in hot oil. Composites of more than two shrimp can be assembled in a similar manner.

In a variant of the above described method, the tail is removed from the larger shrimp in each pair, with the smaller shrimp retaining its tail. This variation may be desirable in cases where a particular supply of block frozen shrimp is characterized by a propensity of the larger shrimp in that block to break off their tail in handling. In such cases, the smaller shrimp will be less prone to loss of its tail, so that the tail is removed from the larger shrimp in each pair instead. In such case, the larger shrimp is still placed on the bottom of the tray pocket, with the tailed smaller shrimp on top. The appearance of the assembled shrimp pair does not vary significantly whether the tail remains attached to the upper or lower shrimp in the tray pocket.

BRIEF DESCRIPTION OF THE DRAWINGS

FIG. 7 indicates a presently preferred sequence of steps numbered 110 through 260 for practicing the method of this invention, while FIGS. 1 through 6 illustrate various stages of the process.

DETAILED DESCRIPTION OF THE PREFERRED EMBODIMENTS

The supply of shrimp to be processed will normally consist of one or more blocks of block-frozen deheaded shrimp preselected to a relatively narrow range of sizes, such as 61 through 70 count. The block of shrimp will contain some shrimp which are slightly larger and others slightly smaller. With reference to FIG. 7, in steps 110 and 120, the block of frozen shrimp is thawed and the shrimp are shelled, deveined in a conventional manner, and washed in a dilute bleach solution, i.e. a chlorine solution, of about five part per million (2 mg/100 liter chlorine solution) to control bacteria which may be present on the shrimp. The shrimp are contained in a wire basket which is lowered into the chlorine solution for 20 seconds followed by draining of the chlorine solution for about 5 minutes.

Figure 1:
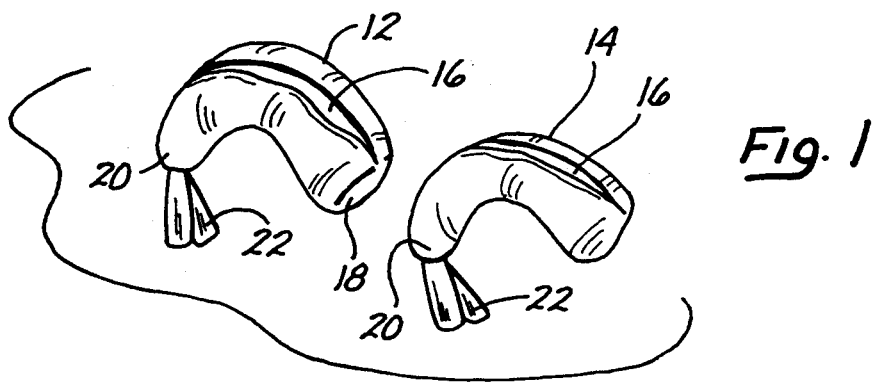
FIG. 1 shows a larger and a smaller shrimp paired together, both shrimp deheaded and shelled, with a butterfly cut extending along the dorsal side of each shrimp.

The shelled shrimp are then sorted into two groups or batches according to size, in step 130, a first group consisting of the larger shrimp, the second group of the smaller shrimp in the block. FIG. 1 shows a typical pair of deheaded and shelled shrimp, including a larger shrimp 12 and a smaller shrimp 14. The tail 22 is removed from the smaller shrimp 14, in step 140, by pulling so as to leave attached the tail meat. The tail 22 is left on the larger size shrimp 12. A butterfly cut 16 is made, as step 150, along the dorsal side of each shrimp body 12, 14 extending nearly the full length of the shrimp body from the head end 18 to the tail end 20, near the tail 22. The tail end 20 of the smaller shrimp 14 is divided by the butterfly cut which, however, stops short of the head end 18.

Handling of the shrimp at all stages of the process prior to blast freezing must be under conditions which inhibit development of microorganism and harmful bacteria in the shrimp. The process is preferably is carried out in cold rooms at an ambient temperature of 18° C. while the shrimp are kept at a temperature of 5° C. under crushed ice during the shelling, deveining and butterflying stages. Failure to keep the shrimp at sufficiently cold temperatures will quickly lead to decomposition and consequent color changes of the shrimp, which must then be discarded.

Figure 6:
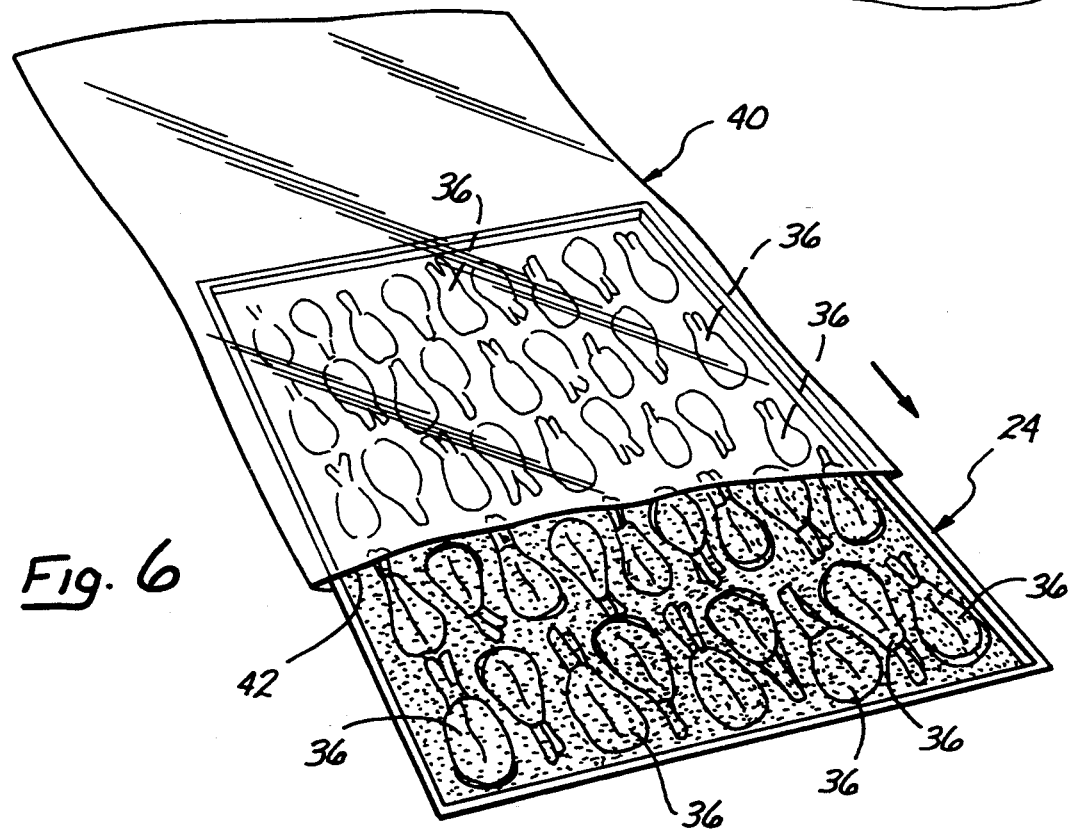
FIG. 6 shows a tray fully loaded with shrimp composites in each tray pocket, and the tray being inserted into a plastic bag in preparation for blast freezing.
Figure 3:
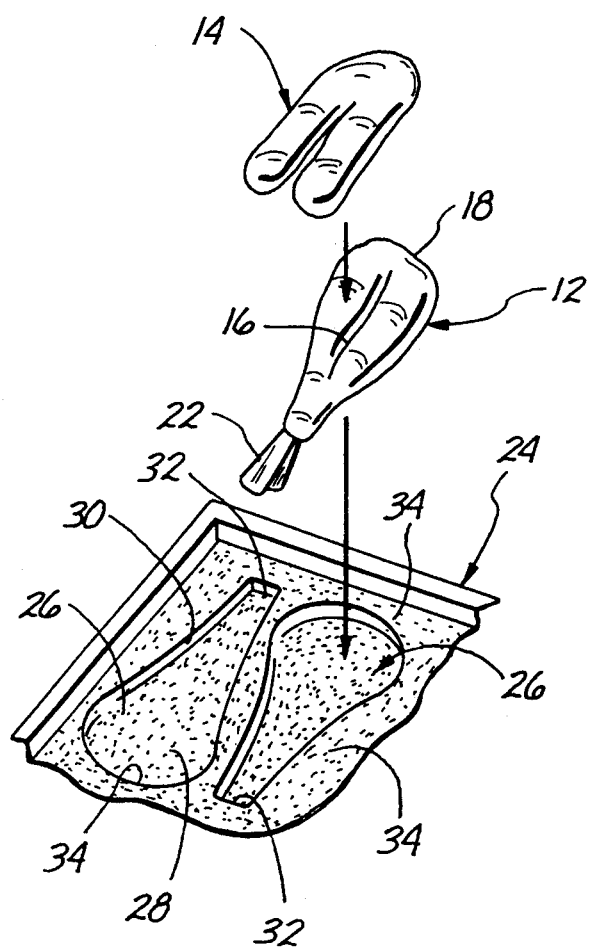
FIG. 3 shows a corner of the dusted empty tray with two tray pockets, and the two butterflied shrimp of FIG. 2 shown ready for assembly placement onto the tray.

The shrimp process according to this invention involves the use of a tray 24, which is shown in its entirety in FIG. 6. The tray 24 is made of vacuum formed thin plastic sheet material, preferably clear, transparent plastic. The weight of the tray is very light and is negligible in relation to the weight of the shrimp which it carries. This feature facilitates weighing of the finished product in that the weight of the tray may be disregarded. The tray 24 has forty five tray pockets 26 arranged in five rows of nine pockets each. FIG. 3 shows a corner of the tray 24 with two tray cavities 26. Each tray cavity is a shallow, drop shaped depression with a flat bottom 28 and a side wall 30. The drop shape of the cavity defines a wide, rounded head end 34 and a narrow, tapering tail end 32. All tray cavities 26 on the tray 24 are similar to one another. In each of the five rows, the tray cavities are side to side with the head and tail ends alternately reversed along the row so as to optimize use of the tray surface.

The entire empty tray 24 is covered in step 160 with a light first dusting of white flour 34, including the bottom of each pocket 26. Each pocket 26 is then filled with a pair of shrimp, as follows. First, in step 170 a larger shrimp 12 is placed dorsal side up on the bottom 28 of the tray cavity, with the head end 18 of the shrimp body oriented towards the wide end 34 of the tray cavity, and the tail 22 of the shrimp body towards the narrow end 32 of the tray cavity. The shrimp 12 is laid open to a generally flattened condition on the pocket bottom by spreading apart the sides of the shrimp along the cut 16.

Figure 2:
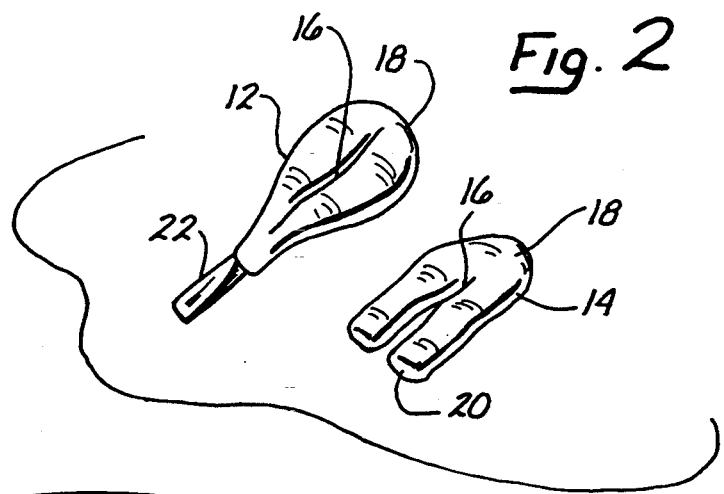
FIG. 2 shows the shrimp pair of FIG. 1 wherein the tail has been removed from the smaller shrimp and both shrimp have been spread apart along the butterfly cut.
Figure 4:
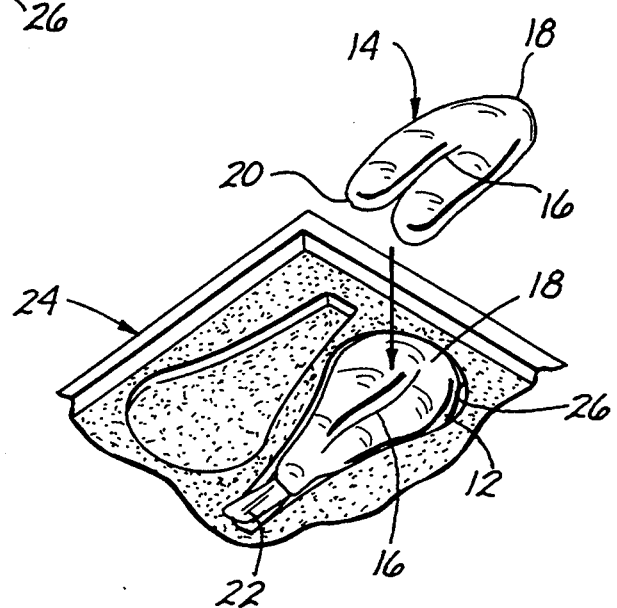
FIG. 4 shows the tailed larger shrimp placed in one of the tray pockets and the smaller tailless shrimp ready for assembly thereto.
Figure 5:
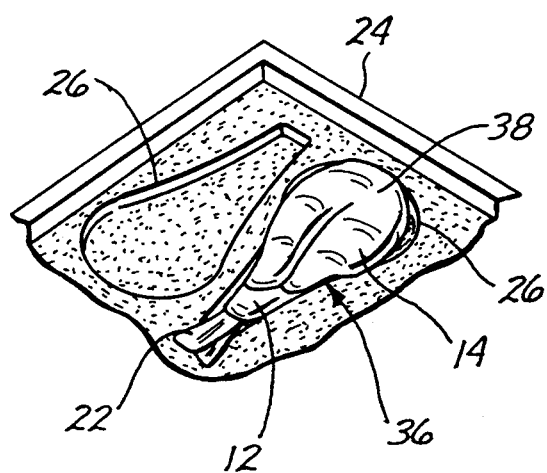
FIG. 5 shows the shrimp pair assembled to form a shrimp composite in the tray pocket and coated by the second dusting of the tray.

The tailless smaller shrimp 14 is then placed, in step 180, dorsal side up on the larger shrimp 12, as indicated in FIG. 4, in the same orientation relative to the tray pocket, i.e. with the head end 18 towards the wide end of the tray pocket, and the tail end 20 towards the narrow end 32 of the tray pocket. The ventral side of the smaller shrimp 14 lies within and along the butterfly cut 16 of the bottom shrimp 12, supported on the upward-facing spread-apart dorsal side of the bottom shrimp 12. Each tray pocket 26 is sized so as to comfortably admit one of the larger size butterflied shrimp 12 when spread open and flat on the bottom 28 of the pocket, and deep enough to accept a smaller butterflied shrimp 14 placed over the larger shrimp 12. The assembled first and second shrimp 12, 14 are then lightly patted down against the bottom of the pocket in order to press together and improve adhesion between the shrimp bodies, forming a two-shrimp composite 36 illustrated in FIG. 5. The sequence of steps illustrated in FIGS. 2 through 4 is repeated for each pocket 26 on tray 24, as step 190 in the sequence of FIG. 7, until all tray pockets are filled with composites 36 of assembled shrimp pairs, as illustrated in FIG. 6.

The loaded tray 24 is then dusted with a second dusting 38 of white flour, step 200, covering all the shrimp composites 36 on the tray. The undersurfaces of the shrimp composites pick up flour from the first dusting of the empty tray, so that following both dustings, each composite 36 is substantially covered, top and bottom, with flour. The total amount of flour deposited on the tray by both dustings is typically no more than 3% of the total weight of the tray loaded with shrimp, although lighter dustings, for example between 1.5% and 2%, may be requested by the buyer.

The loaded tray 24 is then covered, in step 210, with an impermeable plastic film, which may be a rectangular plastic bag 40 as shown in FIG. 6. The load tray is inserted into the bag, and the open end 42 of the bag may be simply folded underneath the tray. The covered tray loaded with shrimp is then placed in a blast freezer where the shrimp composites are rapidly frozen to a temperature of minus 85° F., as step 220. Blast freezing is distinct from ordinary freezing in that blast freezing is very rapid and achieves a much lower temperature. The minus 85° F. temperature preferred for the present process, for example, is far below the minus 35° F. typical of seafood freezing processes in the industry. The blast freezing effectively melds together the paired shrimp in each composite 36 on the tray by rapidly solidifying fluid present between contacting surfaces of the paired shrimp 12, 14, in addition to, of course, preserving the perishable seafood. The frozen fluid acts as a cement to hold together the paired shrimp in each tray pocket 26. The tray 24 with its pockets 26 serves to keep the individual shrimp composites 36 away from contact with each other during the blast freezing step, to avoid agglomeration of the composites. The tray is a low cost and disposable carrier which also provides a sanitary and convenient work surface for assembling the shrimp composites.

At this stage in the process the paired shrimp are ready for shipment and distribution through commercial channels, step 230. Following the blast freezing step the shrimp composites 36 are kept frozen at temperatures conventional in the industry for storage, such as minus 10° Fahrenheit, at all times during shipment and storage until just prior to cooking, and it has been found that adhesion between the paired shrimp assembled according to the process described above remains sufficient to withstand the shaking inherent in normal handling and transportation for commercial distribution. The composite shrimp may be shipped on the tray 24 for superior protection against separation of the shrimp pairs during transport, but may also be shipped loosely bagged without the tray 24. In either case, whether on the tray or loosely bagged, the composite, paired shrimp are shipped in cartons and are packaged in such a manner as to be protected against excessive shifting and shaking in the cartons.

At the food preparation site, the shrimp composites 36 are kept in a frozen state until just prior to preparation for consumption, i.e., cooking. At that time, the frozen shrimp composites 36, while still in frozen or in early stages of thawing, are individually hand-dipped in a frying batter of any suitable composition, in step 240. The composites 36, fully coated in the liquid batter, are then immersed in a hot frying liquid, typically by dropping into hot oil in a deep fryer of conventional design, as step 250. The shrimp composites are deep fried for an appropriate period of time sufficient to harden the batter coating and to cook the shrimp 12, 14 to a condition suitable for eating, the final step 260 in the process. The frying batter solidifies almost immediately upon immersion in the hot frying liquid and holds together the paired shrimp 12, 14 in each composite 36 throughout the cooking, serving and eating stages of consumption of the paired shrimp. Even with partial thawing of the shrimp composites, sufficient cohesiveness will typically remain between the assembled shrimp to hold together the composite 36 while it is dipped in batter and dropped into a deep fryer. Immersion in hot oil almost immediately hardens the batter which then forms a solid shell around the paired shrimp and ensures that the composite holds together through removal from the deep fryer, arrangement on a platter, and transport on a fork to the consumer's mouth. Furthermore, separation of a small proportion of the shrimp composites 36 in any particular batch of the product is acceptable and does not significantly detract from the increased gastronomic satisfaction derived from consumption of a serving of shrimp processed according to this invention.

The block-frozen shrimp preferred for the process of this invention range in size from about 3.8 to 7 grams per shrimp (deheaded but with shell and tail), which translates to 130–150 count up to about 61–71 count. A desirable target weight for the shrimp composites 36 is in the range of 8.5 to 9.5 gr per composite, equivalent to 47 to 53 count shrimp. The presently preferred tray 24 holds 45 shrimp composites in as many tray pockets, for a target weight of 385 gram of the loaded tray 24. Twenty six loaded trays may be packed in a box for shipment in commerce. Alternatively, the shrimp composites 36 may be bagged loosely, 180 composites per bag, 6 bags per carton for a total of 1,080 shrimp composites per box.

In a variant of this process, the tail 22 may be removed from the larger shrimp in each shrimp pair, leaving the tail on the smaller shrimp. This may be desirable in cases where the shrimp supply is characterized by a tendency of the larger shrimp to more readily lose their tail in handling. In that case, the tail may be left on the smaller shrimp, and the smaller shrimp may be placed on the bottom of the tray pocket, with the tailless larger shrimp on top. It may also happen that the shrimp supply is such that the tail resists easy removal, in which case it will be easier to pull off the tail from the larger shrimp, and the tail is then left on the smaller shrimp instead. The smaller shrimp with tail may be placed on the bottom of the tray pocket, with the tailless larger shrimp on top.

The appearance of the deep fried shrimp composites sufficiently resembles a single deep fried shrimp of comparable overall weight, and is readily accepted as such by most diners. Nor does the taste and texture of the deep fried paired shrimp differ markedly from a single large shrimp cooked in similar fashion. The crunchiness of the fried batter tends to dominate over the delicate texture of the shrimp flesh so that the presence of two shrimp pieces within the batter covering is largely masked to the senses of the consumer. It should be further appreciated that enjoyment of the food need not be in any way diminished even in the case where a diner happens to discover that the apparently large shrimp are actually composites of smaller shrimp, so long as the sensory experience remains comparable to that of consumption of genuine large shrimp. That is, it is not the object of this invention to actually deceive the consumer, but rather to provide a more satisfying gastronomic experience over that of consuming individually deep fried smaller shrimp.

This process is not limited to any particular species of shrimp, and in fact different shrimp species can be mixed in the supply of shrimp for processing according to this invention.

The method of this invention can be readily extended to shrimp composites consisting of more than two shrimp. For example, large shrimp can be simulated by assembling three relatively small shrimp in a manner analogous to the two shrimp process above, using one tailed shrimp laid in the center of the tray pocket 26 and two tailless shrimp bodies laid side by side to each other, each partly overlapping the tailed center shrimp. The three shrimp assembly, when dipped in batter and deep fried still sufficiently resembles a single large shrimp that the simulation will not be remarkable much of the time. A four shrimp composite is also possible by centering a fourth tailless shrimp over the three shrimp composite just described. Three and four shrimp composites, while more labor intensive, are useful for adding value to the supply of still smaller shrimp than those used in the two shrimp process.

While certain preferred embodiments of the invention have been described and illustrated for purposes of clarity and example, it must be understood that many changes, substitutions, and modifications to the described embodiments will become obvious to those possessed of ordinary skill in the art without thereby departing from the scope and spirit of the present invention, which is defined by the following claims.

What is claimed is:

1. A method for assembling a plurality of smaller shrimp into a shrimp composite, comprising the steps of:
   providing a supply of deheaded shelled shrimp;
   butterflying multiple pluralities of shrimp selected from said supply;
   removing the tail of all but one in each of said pluralities;
   assembling each of said pluralities of shrimp in at least partially mutually overlapping relationship to form multiple shrimp composites, each composite resembling in appearance a single butterflied shrimp of larger size than any one shrimp in said composite, each composite having mutually contacting shrimp surfaces interior to said composite and exterior shrimp surfaces of said composite;
   dusting only said exterior shrimp surfaces and not said contacting shrimp surfaces of said composite with an edible powder; and then
   blast freezing said multiple shrimp composites while keeping said composites spaced apart from each other to form a cohesive bond at said contacting surfaces between shrimp in each of said composites without binding said composites to each other.

2. The method of claim 1 further comprising the steps of coating each said shrimp composite with an edible batter and solidifying the coating by heating.

3. The method of claim 1 wherein said blast freezing comprises rapidly freezing to a temperature substantially below minus 35 degrees Fahrenheit.

4. The method of claim 1 wherein said shrimp comprising each of said pluralities are not of uniform size and said but one of said shrimp is the largest in each of said pluralities.

5. The method of claim 1 wherein each of said pluralities comprises from two to four shrimp.

6. A method for assembling a plurality of smaller shrimp into a shrimp composite, comprising the steps of:
   providing a supply of deheaded shelled shrimp;
   butterflying a plurality of two to four shrimp selected from said supply including removing the tail of all but one of said plurality;
   providing a tray having multiple pockets;
   assembling said plurality of shrimp in at least partially mutually overlapping relationship to form a shrimp composite in one of said pockets, said composite resembling in appearance a single butterflied shrimp of larger size than any one shrimp in said composite, said composite having mutually contacting shrimp surfaces interior to said composite and exterior shrimp surfaces of said composite;
   repeating said butterflying and assembling steps to form multiple shrimp composites, each of said composites being in a separate pocket in said tray; and then
   blast freezing said tray with said multiple shrimp composites to form a cohesive bond at said contacting surfaces between shrimp in each of said composites without binding said shrimp composites to each other.

7. The method of claim 6 wherein said blast freezing comprises freezing to a temperature of about minus 80 degrees Fahrenheit or below.

8. The method of claim 6 further comprising the steps of coating each said shrimp composite in a batter and then frying the coated shrimp composite in a hot liquid.

9. The method of claim 6 further comprising the step of first dusting the empty tray before said assembling and again dusting said tray and said shrimp composite prior to said blast freezing.

10. The method of claim 6 further comprising the step of bagging said tray with said shrimp composite in an impermeable film prior to said blast freezing.

11. A method for processing smaller shrimp to simulate larger frozen shrimp, comprising the steps of:
    pairing shrimp from a supply of deheaded, shelled shrimp in multiple shrimp pairs;
    removing the tail of only one shrimp in each of said shrimp pairs;
    butterflying each shrimp in each of said pairs;
    assembling the shrimp in each of said pairs by laying the tailless shrimp onto the cut side of the tailed shrimp;
    spacing the assembled shrimp pairs away from contact with each other; and then
    blast freezing the assembled shrimp pairs while spaced apart from each other.

12. The method of claim 11 wherein said blast freezing comprises freezing to a temperature substantially below minus 35 degrees Fahrenheit.

13. The method of claim 11 wherein each of the paired shrimp has a cut dorsal side and an uncut ventral side, and wherein said tailless shrimp is laid with its ventral side onto the cut dorsal side of said tailed shrimp.

14. The method of claim 11 wherein each of the paired shrimp has a head end and a tail end, and said shrimp are laid one onto the other head end to head end and tail end to tail end.

15. The method of claim 11 wherein said step of removing the tail comprises the step of pulling off the tail without removing the tail meat of the shrimp.

16. The method of claim 11 said step of spacing comprises providing a carrier configured to hold a plurality of assembled shrimp pairs away from contact with each other during said blast freezing, and wherein said assembling comprises placing paired shrimp onto said carrier.

17. The method of claim 16 wherein said carrier has a plurality of pockets and said assembling comprises assembling a shrimp pair in each of said pockets.

18. The method of claim 17 wherein said carrier is a tray and each of said pockets is a generally drop shaped flat bottomed cavity.

19. The method of claim 11 further comprising the steps of providing a tray defining multiple pockets of uniform size and shape, and wherein said assembling comprises assembling a shrimp pair in each of said pockets.

20. The method of claim 19 wherein said assembling comprises finger pressing together an assembled shrimp pair to improve adhesion between mutually contacting surfaces of said pair in each of said pockets prior to said blast freezing.

21. The method of claim 19 further comprising the steps of dusting said tray before said assembling and dusting said tray and the assembled shrimp thereon after said assembling, such that mutually contacting surfaces of the shrimp in each said pair are free of said dusting.

22. The method of claim 21 further comprising the step of bagging said tray in an impermeable film after said assembling and wherein said blast freezing comprises blast freezing said tray and the assembled paired shrimp thereon.

23. The method of claim 22 further comprising the step of removing the dusted and blast frozen shrimp from said tray and loosely bagging the assembled shrimp for shipment in commerce.

24. The method of claim 21 wherein said dusting comprises about 1.5% to 3% of the total weight of the assembled shrimp on the tray.

25. The method of claim 19 wherein said tray is of substantially negligible weight relative to the assembled shrimp in said pockets.

26. The method of claim 25 wherein said tray is of vacuum molded thermoplastic sheet material.

27. The method of claim 19 wherein said tray has 45 of said pockets.

28. The method of claim 27 wherein the total weight of paired shrimp in said 45 pockets is approximately 385 grams.

29. The method of claim 11 wherein said shrimp in each of said pairs are of different size.

30. The method of claim 29 wherein the tail is removed from the smaller of the shrimp in each of said pairs and the smaller shrimp is placed on the larger shrimp in each of said pairs.

31. The method of claim 11 wherein said shrimp are characterized by above average resistance to removal by pulling of the shrimp tail, and the tail is removed from the larger shrimp in each of said pairs and the larger shrimp is placed on the smaller shrimp in each of said pairs.

32. The method of claim 11 wherein said shrimp are paired for a combined weight of about 8.5 to 9.5 grams.

33. A method for processing smaller shrimp to simulate larger frozen shrimp, comprising the steps of:
providing a plurality of deheaded, shelled shrimp pairs;
removing the tail of only one shrimp in each said pairs;
butterflying each of the paired shrimp;
providing a carrier having a plurality of depressions, each sized for holding one of said shrimp pairs;
dusting said carrier with flour;
assembling each shrimp pair in a corresponding one of said depressions on said carrier by laying the tailless shrimp onto the cut side of the tailed shrimp;
again dusting said carrier and the assembled shrimp thereon with flour, so that only exterior surfaces of the assembled shrimp are dusted and mutually contacting shrimp surfaces of the assembled shrimp remain free of said dusting;
bagging said tray in an impermeable film; and then
subjecting the tray with the assembled shrimp pairs to blast freezing to thereby form an adhesive bond by freezing fluids between said contacting surfaces of each of said shrimp pairs without bonding said shrimp pairs to each other.

34. The method of claim 33 wherein said blast freezing comprises freezing to a temperature of about minus 80 degrees Fahrenheit or below.

35. The method of claim 33 further comprising the step of coating each assembled shrimp pair in a liquid edible batter and solidifying said batter by heating.

36. A method for making a composite seafood product, comprising the steps of:
providing a supply of deheaded shelled shrimp;
butterflying multiple pluralities of shrimp selected from said supply, each of said pluralities having two to four of said shrimp;
removing the tail of all but one shrimp in each of said pluralities;
assembling each of said pluralities of shrimp into a shrimp composite resembling in appearance a single butterflied shrimp of larger size than any one shrimp in said composite, said composite having mutually contacting shrimp surfaces interior to said composite and exterior shrimp surfaces of said composite; and then
simultaneously blast freezing the shrimp composites while keeping the composites spaced apart from each other to form a cohesive bond at said contacting surfaces between shrimp in each of said composite without binding the composites to each other.

37. The method of claim 36 further comprising the step of dusting only said exterior shrimp surfaces and not said contacting shrimp-surfaces of said composite with an edible powder prior to said blast freezing.

38. The method of claim 36 wherein each shrimp in each of said pluralities has a cut dorsal side and an uncut ventral side, and wherein the tailless shrimp are laid with its ventral side onto the cut dorsal side of the tailed shrimp.

39. The method of claim 36 wherein each shrimp in each of said pluralities has a head end and a tail end, and said shrimp are laid one onto the other, head end to head end and tail end to tail end.

40. The method of claim 36 wherein said assembling comprises finger pressing together the shrimp in each of said pluralities to improve adhesion between said mutually contacting surfaces in each of said composites prior to said blast freezing.

* * * * *